United States Patent [19]
Evoy et al.

[11] Patent Number: 6,085,307
[45] Date of Patent: Jul. 4, 2000

[54] MULTIPLE NATIVE INSTRUCTION SET MASTER/SLAVE PROCESSOR ARRANGEMENT AND METHOD THEREOF

[75] Inventors: David Ross Evoy, Tempe; Paul S. Levy, Chandler, both of Ariz.

[73] Assignee: VLSI Technology, Inc., San Jose, Calif.

[21] Appl. No.: 08/757,151

[22] Filed: Nov. 27, 1996

[51] Int. Cl.$^7$ .................................................. G06F 15/16
[52] U.S. Cl. .................... 712/31; 712/1; 712/28; 712/29; 712/30; 712/33; 712/34; 712/200; 712/209; 395/500.01; 395/500.02; 395/500.4; 395/500.47; 395/500.49
[58] Field of Search ................. 395/800.31, 800.41, 395/800.29, 800.3, 500.01, 500.02, 500.04, 500.47, 500.49; 712/1, 28, 29, 30, 31, 34, 200, 209

[56] References Cited

U.S. PATENT DOCUMENTS

| | | | |
|---|---|---|---|
| 4,876,643 | 10/1989 | McNeill et al. | 364/200 |
| 4,888,680 | 12/1989 | Sander et al. | 364/200 |
| 5,036,453 | 7/1991 | Renner et al. | 364/200 |
| 5,073,854 | 12/1991 | Martin et al. | 364/425 |
| 5,109,329 | 4/1992 | Strelioff | 395/725 |
| 5,218,711 | 6/1993 | Yoshida | 395/800 |
| 5,495,588 | 2/1996 | Gilbart et al. | 395/375 |
| 5,590,284 | 12/1996 | Crosetto | 395/200.05 |
| 5,778,178 | 7/1998 | Arunachalam | 395/200.33 |

OTHER PUBLICATIONS

*The ARM6 Family Bus Interface*, Advanced RISC Machines Ltd. (1996).
*The ARM Microprocessor Architecture*, Advanced RISC Machines Ltd. (1996).
Wayner, "Sun Gambles On Java Chips", Byte, Nov. 1996.
*Java Virtual Machine Architecture*, Sun Microsystems (1996).

*Primary Examiner*—Daniel H. Pan
*Assistant Examiner*—Dzung C Nguyen

[57] ABSTRACT

A multiple processor circuit arrangement utilizes a master processor which controls the operational state of a slave processor by programming internal control registers on the slave processor. In addition, a stack-based processor utilizes a stack cache for accelerating stack access operations and thereby accelerating the overall performance of the processor. When the stack-based processor is utilized as a slave processor in the aforementioned master/slave multi-processor computer system the slave processor is optimized to process platform-independent program code such as Java bytecodes, thereby permitting fast and efficient execution of both program code native to the master processor as well as platform-independent program code that is in effect native to the slave processor.

28 Claims, 8 Drawing Sheets

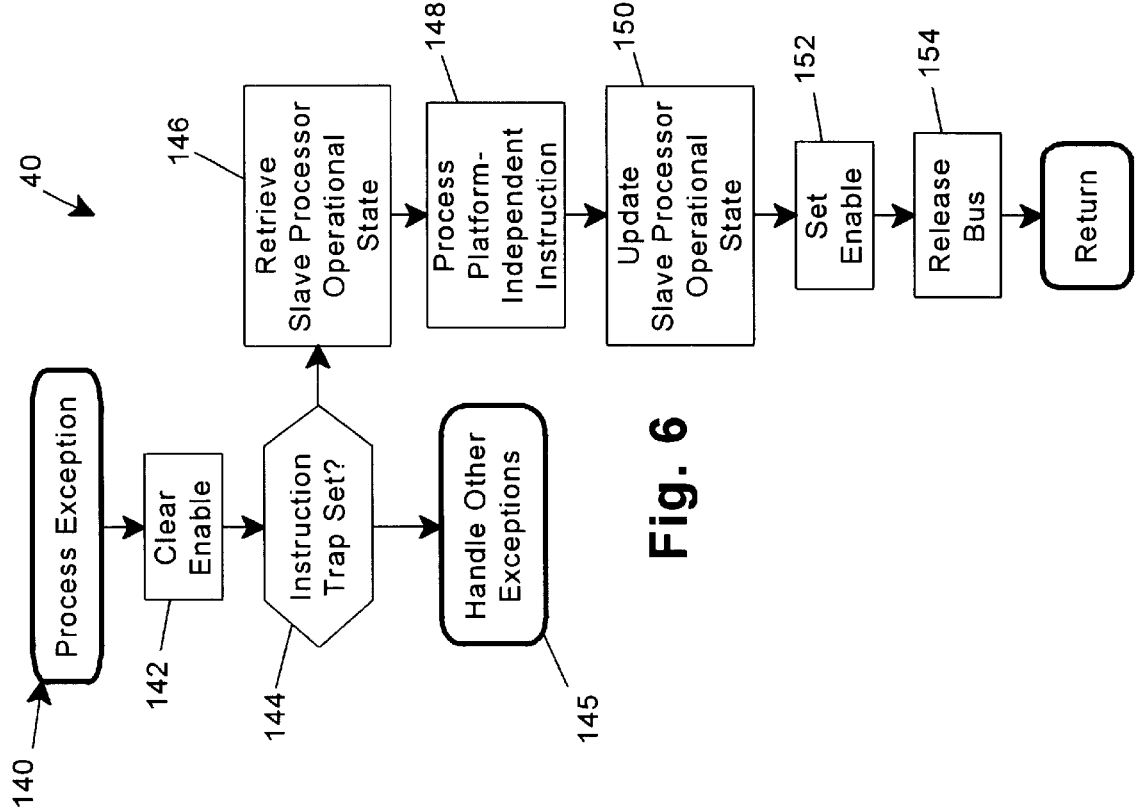
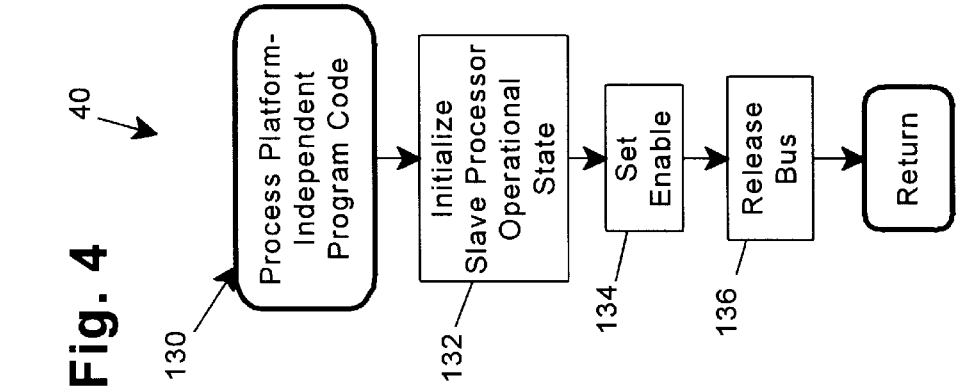

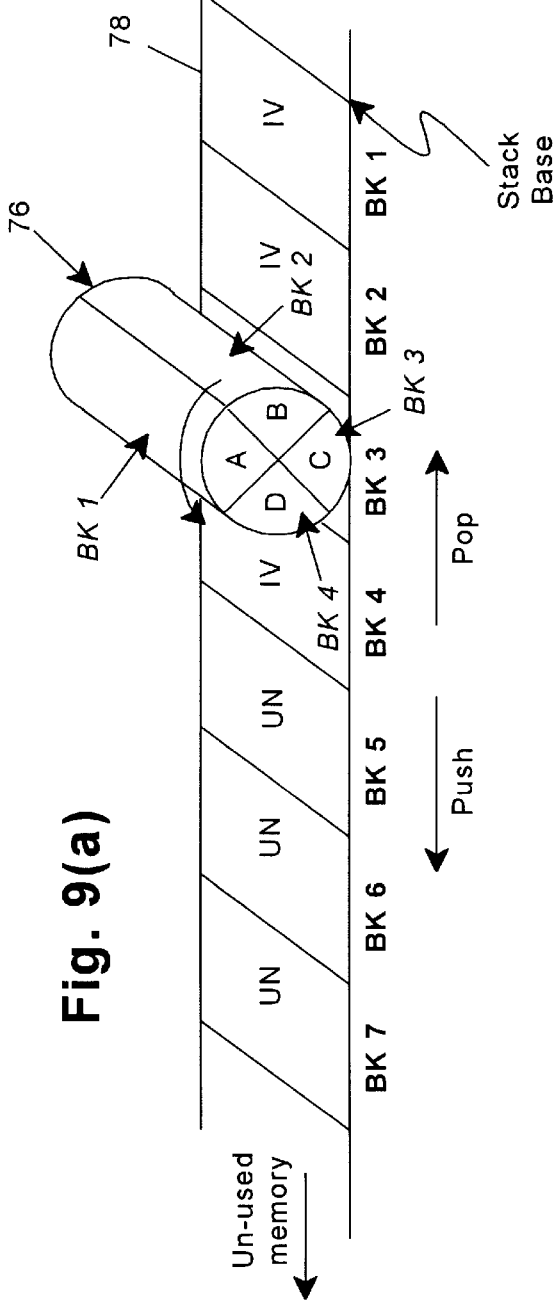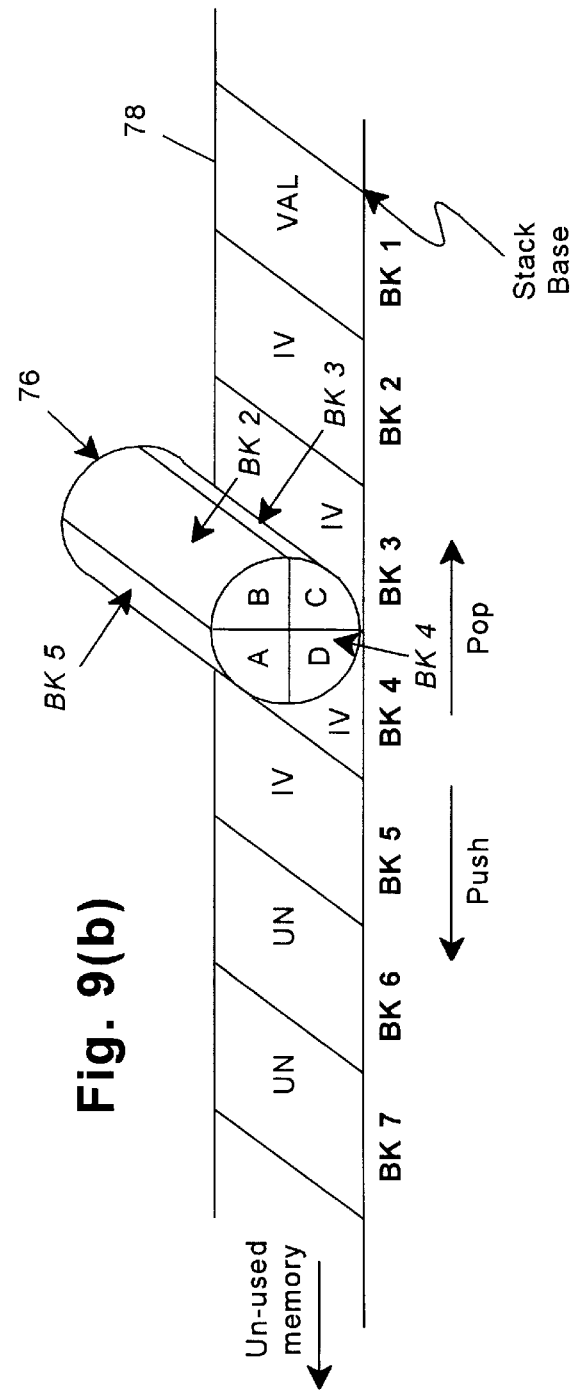
Fig. 9(a)
Fig. 9(b)

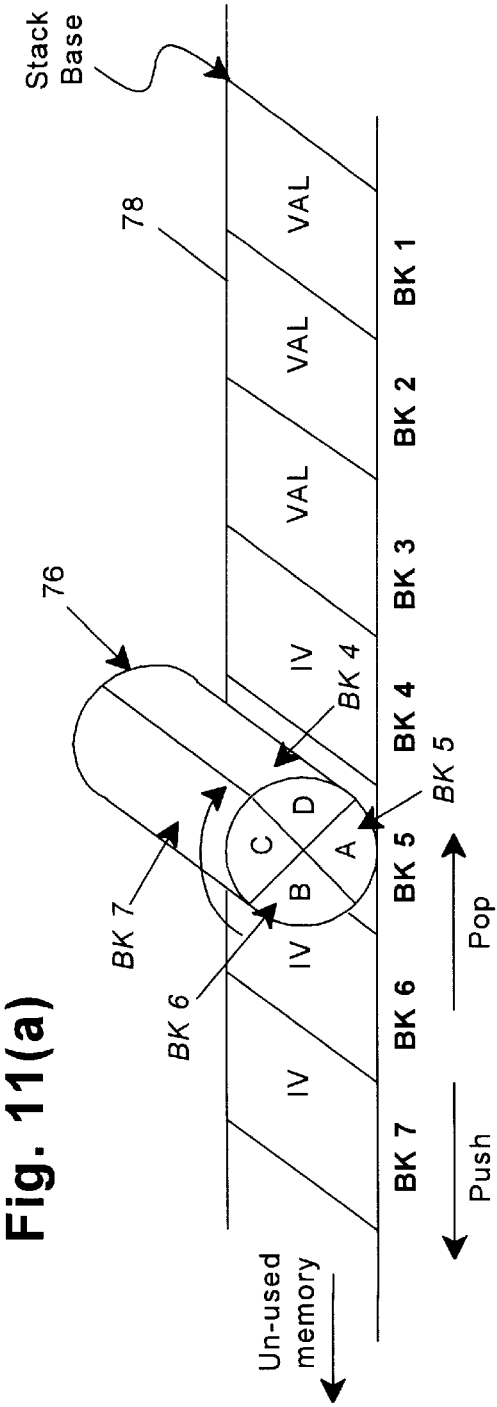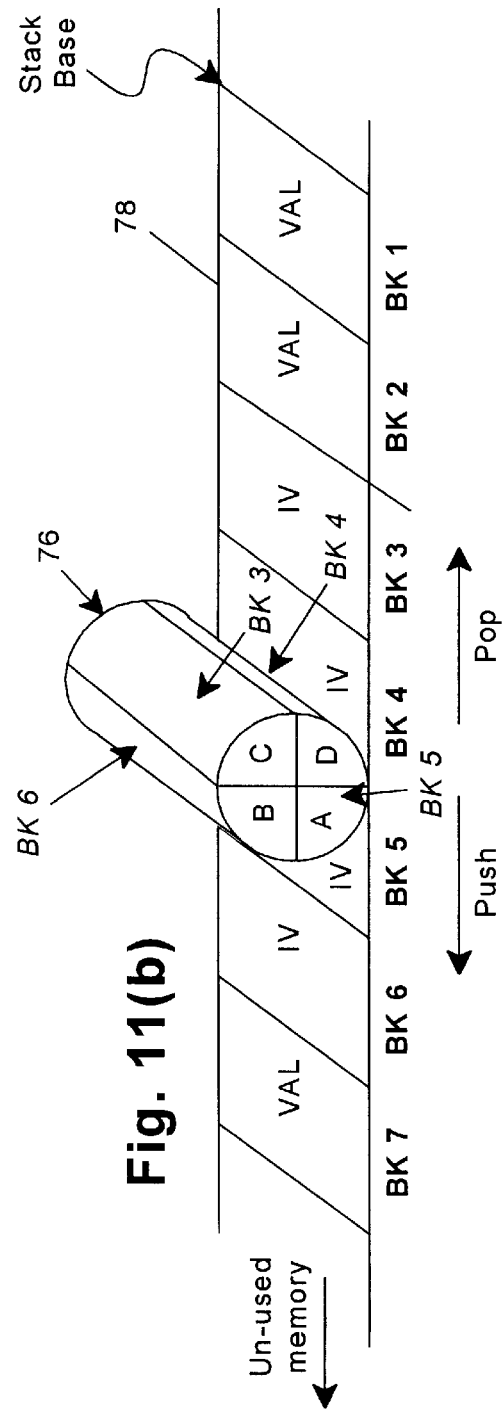

6,085,307

MULTIPLE NATIVE INSTRUCTION SET MASTER/SLAVE PROCESSOR ARRANGEMENT AND METHOD THEREOF

FIELD OF THE INVENTION

The present invention relates to computer and data processing arrangements. More particularly, the invention relates generally to task allocation between multiple processors and accelerating performance of stack-based processors in such arrangements.

BACKGROUND OF THE INVENTION

Platform-independent programming languages, such as the "Java" programming language from Sun Microsystems, Inc., offer significant advantages over traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform specific compilers to generate program code that is native to one particular hardware platform. While the same source code may in some instances be compiled by different platform-specific compilers into suitable program code for multiple platforms, the resulting program code is not platform-independent.

Most platform-independent program code is in an intermediate code format, since further processing is required to execute it on a specific hardware platform. For Java, for example, the intermediate codes are referred to as bytecodes. Typically, a compiler is used to generate a series of intermediate codes from a source file. The intermediate codes are then executed by a software interpreter which converts them into native instructions for the computer system on the fly. Consequently, the intermediate codes are executable on any computer system having a suitable interpreter.

Many platform-independent program codes are relatively compact, which makes them readily suited for downloading over a network or modem. Moreover, since the program code is platform-independent, the downloading computer system (or server) can download the same program code irrespective of the particular hardware platform of the executing computer system (or client). Consequently, platform-independent program codes such as Java are expected to enjoy immense popularity for the distribution of software programs over the Internet. Typically, platform-independent software programs downloaded from the Internet are in the form of applets which execute within a web browser. It should be understood, however, that platform-independent program code has many other uses, including in stand-alone applications, operating systems, and real-time embedded systems, among others.

One problem with platform-independent program code, however, is that the program code must be interpreted during run time, which significantly reduces execution speed compared to program code native to a particular hardware platform. Some Java interpreters, for example, may require up to 50 processor clock cycles to process each bytecode, compared to typically one clock cycle for most native instructions.

As an alternative to run time interpretation, software-based just-in-time (JIT) compilers have been developed to optimize interpretation of platform-independent program code, typically by emulating the functionality of the platform-independent code using native code. While execution speed is increased over simple runtime interpretation, the platform-independent program code is still slower than native code, and additional memory space is required to store the compiler code.

At the other extreme, dedicated processors (e.g., for Java, the picoJAVA, microJAVA and UltraJAVA processors from Sun Microelectronics) have been proposed to utilize platform-independent instructions as their native instruction set. While these processors may have the capability of running platform-independent program code as fast as other native program codes for other hardware platforms, the processors suffer from the same problems as any other processor when executing non-native program code.

Moreover, because many of the architectures for dedicated processors are stack-based (see, e.g., the Java Virtual Machine Specification), significant performance limitations exist in these processors since frequent memory accesses are required to access a stack. Much of the computer industry has moved away from stack-based architectures in part due to the memory and performance bottlenecks presented by the use of a stack.

It is estimated that in the future as much as 50% or more of the program code run on any particular hardware platform may be platform-independent. However, a large portion of program code will still be platform specific. Consequently, a substantial need exists for a manner of accelerating the execution of platform-independent program code on a hardware platform without adversely impacting the execution speed of native program code thereon.

SUMMARY OF THE INVENTION

In accordance with one aspect of the invention, there is provided a circuit arrangement, which includes a slave processor and a master processor. The slave processor includes a control unit configured to process instructions received by the slave processor, an internal control register arrangement configured to provide at least one of several operational states for the slave processor, a program counter register in the internal control register arrangement configured to point to an address of a next instruction to be processed by the control unit, and a control register access port coupled to the internal control register arrangement to provide external access thereto. The master processor is coupled to the slave processor, and is configured to selectively start execution of the slave processor with a predetermined operational state by writing data into the internal control register arrangement through the control register access port to modify the program counter register.

In accordance with another aspect of the invention, a computer system is provided, which includes a slave processor and a master processor. The slave processor includes a control unit configured to process instructions received by the slave processor, an internal control register arrangement configured to provide at least one of several operational states for the slave processor, a program counter register in the internal control register arrangement configured to point to an address of a next instruction to be processed by the control unit, and a control register access port coupled to the internal control register arrangement to provide external access thereto. The master processor is coupled to the slave processor, and is configured to selectively start execution of the slave processor with a predetermined operational state by writing data into the internal control register arrangement through the control register access port to modify the program counter register.

In accordance with a further aspect of the invention, a method is provided for controlling with a master processor the operation of a slave processor coupled to the master processor. The method includes setting an operational state of the slave processor with the master processor by programming an internal control register arrangement in the slave processor, the internal control register arrangement configured to provide the operational state for the slave processor, and the internal control register arrangement including a program counter register; and starting execution of the slave processor with the master processor.

The above summary of the present invention is not intended to describe each illustrated embodiment, or every implementation, of the present invention. This is the purpose of the figures and the detailed description which follow.

BRIEF DESCRIPTION OF THE DRAWING

Other aspects and advantages of the invention will become apparent upon reading the following detailed description and upon reference to the drawings in which:

FIG. 4 is a flowchart illustrating the program flow of a platform-independent program code processing routine executed on the master processor of FIG. 2;

FIG. 6 is a flowchart illustrating the program flow of an exception processing routine executed on the master processor of FIG. 2;

FIGS. 9(a) and 9(b) are functional diagrams illustrating the interaction of the stack cache with the stack respectively before and after execution of the push routine of FIG. 8;

FIGS. 11(a) and 11(b) are functional diagrams illustrating the interaction of the stack cache with the stack respectively before and after execution of the pop routine of FIG. 10.

Figure 1:
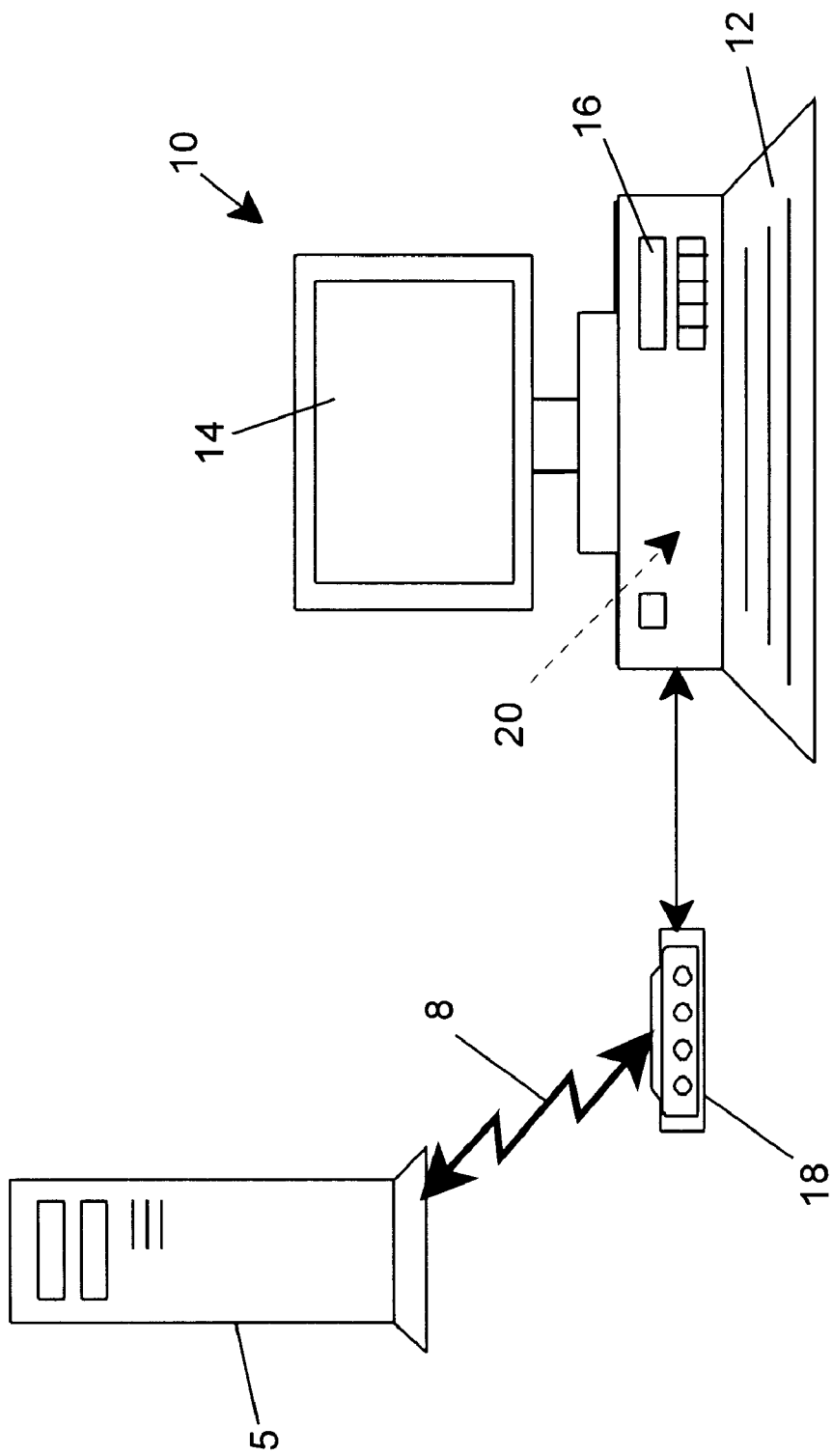
FIG. 1 is a functional diagram of a computer system consistent with the principles of the present invention, and shown coupled to an external server over a network.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE ILLUSTRATED EMBODIMENTS

Turning to the drawings, FIG. 1 illustrates a computer system 10 consistent with the principles of the present invention. Computer system 10 is, for example, a desktop computer (e.g., based upon a Macintosh or Intel x86 platform) or UNIX workstation having a user input device 18 such as a keyboard and/or mouse, video display or monitor 14, and mass storage 16. Computer system 10 also includes a communications interface such as modem 18 or a network connector for coupling to one or more servers such as server 5 over a network 8. Network 8 is, for example, a private LAN or WAN, a bulletin board system, or a public network such as the Internet.

It is typically over network 8 that computer system 10 is likely to receive platform-independent program code, since often the servers coupled to computer system 10 over network 8 cannot detect the particular hardware platform of the system, and since it is often desirable for the servers to only have to download one version of program code for a given application. However, it should be appreciated that platform-independent program code may be received from computer system 10 by any number of alternate manners, including removable storage devices such as floppy disks, CD-ROM's, magnetic tape, and flash memories, etc. Moreover, platform-independent program code may be initially stored in computer system 10, e.g., in ROM's and other non-volatile devices, on hard drives, etc. It should also be appreciated that the platform-independent program code executed by computer system 10 may include any type of computer program, including stand-alone applications, operating systems, embedded applications, etc., as well as applets which are executed within a web browser.

In another specific embodiment, computer system 10 is implemented as a network computer (NC) which has little or no mass storage and which principally executes applications downloaded from server 5. With a network computer, a substantial portion of the program code executed by the computer is typically platform-independent. Thus, this type of application particularly benefits from the performance enhancements offered by the various embodiments of the invention.

Computer system 10 may also be any of a number of other computer or data processing systems in which platform-independent program code may be utilized, including various network servers, minicomputers, mainframe computers, workstations, desktop computers, laptop computers, mobile computers, embedded controllers, etc.

As will be apparent from the description herein, in one aspect the invention provides a manner of interfacing multiple processors that are coupled in a novel master/slave arrangement. Another aspect of the invention provides a manner of maintaining a stack cache for a stack-based processor to improve the overall performance of the processor. Each of these aspects will be discussed in greater detail herein. However, it should be appreciated that each aspect of the invention may be implemented separate of the other in specific embodiments of the invention.

Multi-processor Interface

Specific embodiments which implement this aspect of the invention generally operate by utilizing multiple processors interfaced in a master/slave relationship whereby a master processor is capable of setting the operational state of a slave processor, typically by writing data into an internal control register arrangement including control registers and/or control flags in the slave processor to start the slave processor with a predetermined set of initial conditions from which the slave processor executes. The slave processor when started operates in accordance with the initial operational state information pre-loaded into the processor by the master processor.

The internal control register arrangement set by the master processor typically includes one or more of the following: program counter (PC) register, instruction (IR) registers, stack pointer register, frame pointer register, variable pointer registers, memory address registers, status registers, accumulator registers, index registers, and data registers, among others. In some embodiments, the master processor also sets control flags, such as zero, carry, negative, interrupt/exception, break, decimal, and overflow flags (among others), many of which are typically grouped together in the same status register. The master processor in another specific embodiment is also capable of setting the initial state and contents of a stack (if one exists in the slave processor).

The master and slave processors are similar or identical processors, or alternatively are dissimilar processors, which often permits each processor to be optimized to perform different tasks which the master processor then allocates between the processors. In one embodiment, the master processor is a load/store architecture RISC processor and the slave processor is a stack-based processor. Moreover, while the master and slave processors are implemented in some embodiments as distinct processors fully capable of existing in separate environments, in other embodiments the slave processor is implemented as a co-processor which is interfaced with and supplements the functionality of the master processor.

In one specific embodiment of the invention, the slave processor is optimized to process platform-independent program code, e.g., Java bytecodes, thereby leaving the master processor to handle native program code for which it is optimized. By partitioning execution of each type of program code to a processor optimized to process the program code, the overall performance of the system is optimized irrespective of which type of program code is executed thereon. While much of the discussion herein will focus on the Java programming language, however, it should be emphasized that the present invention is not limited to any particular programming language or instruction set.

Figure 2:
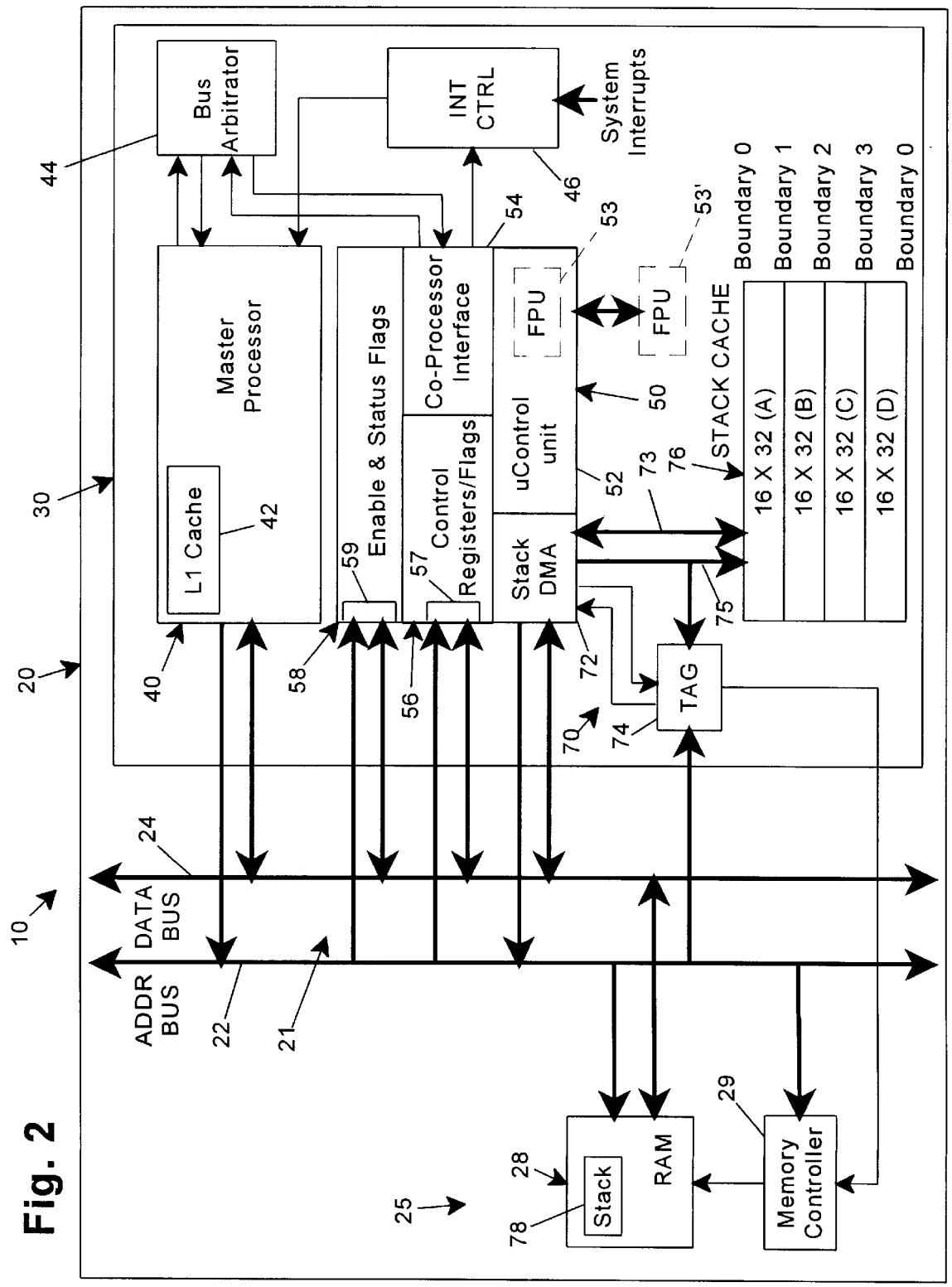
FIG. 2 is a functional block diagram of a portion of the circuit board in the computer system of FIG. 1.

FIG. 2 illustrates a specific embodiment of computer system 10 in greater detail. As shown in this figure, a circuit board 20 (typically a motherboard or the like) in computer system 10 includes a circuit arrangement shown in the form of a microprocessor circuit 30 coupled to a system memory 25 over a system bus 21 including address bus 22 and data bus 24. System memory 25 includes RAM 28, which is controlled by a memory controller 29. Other memory devices, e.g., ROM's and the like, are not shown in this figure. It will be understood that various memory configurations, including various combinations of volatile and non-volatile storage, may be used in the alternative.

Microprocessor circuit 30 is an integrated circuit which includes a number of operational components defined thereon, including a master processor 40 and a slave processor 50 (here, implemented as a co-processor) coupled over bus 21. While processors 40, 50 as shown are disposed on the same integrated circuit device, it should be appreciated that in other embodiments the processors are provided as separate integrated circuit devices and disposed in separate packaging, or mounted on a common carrier such as a multichip module, for example.

Master processor 40 in the illustrated embodiment is a load/store type processor such as an Advanced RISC Machine (ARM) processor available from Advanced RISC Machines, Ltd., or alternatively an SHx RISC processor from Hitachi. Processor 40 includes a 32-bit RISC instruction set implemented in a load/store architecture, and with an on-board level one (L1) cache memory 42. Other processors, including stack-based processors and other load/store processors, may be used in the alternative.

Slave processor 50 in one embodiment is a co-processor optimized to process platform-independent program code such as Java bytecodes. Processor 50 includes a microcoded control unit (uControl) 52 which is designed to directly implement the Java Virtual Machine 1.0 Beta specification released by Sun Microsystems, Inc., which is incorporated by reference herein. In the illustrated embodiment, not all of the Java bytecodes are implemented in control unit 52, as it is believed that roughly 90% of Java bytecodes could be implemented in about ¼ the code required to implement the remaining 10%. For these non-handled instructions, control unit 52 triggers an exception to notify the master processor of the need to halt the slave processor and handle the nonhandled instruction.

For example, Java instructions such as array allocation operations (e.g., anewarray and multianewarray) and method invocation operations (e.g., invokevirtual, invokenonvirtual, invokestatic and invokeinterface) would be particularly code-intensive to implement, and are not executed as commonly as other instructions. Therefore, in the illustrated embodiment the slave processor triggers an exception in response to these instructions so that they can be handled by the master processor.

Moreover, in some embodiments it is desirable to permit master processor 40 to handle floating point operations (e.g.,fadd, dadd, fsub, dsuh, fdiv, ddiv, fmem, and dmem), since many processors utilize floating point units, or co-processors, to accelerate the handling of these types of calculations. In other embodiments, it may be desirable to code floating point operations into control unit 52, possibly utilizing a separate floating point unit (FPU) which is internal to the control unit (e.g., FPU 53 shown in FIG. 2), or implemented as a separate co-processor that is coupled to slave processor 50 (e.g., FPU 53' shown in FIG. 2). In either event, the FPU would be able to grab floating point operations processed by slave processor 50 in a manner known in the art. The FPU in one embodiment is a fully functional floating point unit, e.g., implementing the IEEE 754 standard. In other embodiments, the FPU is Java-specific, with any floating point operations not supported by the Java Virtual Machine Specification (e.g., trig and square functions) eliminated, thereby decreasing the complexity of the FPU.

In other embodiments, the entire Java instruction set is implemented in slave processor 50. However, implementation of all or any portion of the Java Virtual Machine architecture, like any specified computer architecture, is well within the abilities of one of ordinary skill in the art. Accordingly, implementation of this architecture need not be discussed in any greater detail herein.

Control unit 52 relies on a number of internal control registers and flags designated in internal control register arrangement block 56 which define the operational state of slave processor 50, and which are accessible to master processor 40 through a control register access port 57 coupled to bus 21. In the illustrated embodiment, this block includes a program counter (PC) register which contains the address of the next bytecode to be executed, a variable pointer (vars) register which points to a set of variables, an operand stack pointer (optop) register which points to the top of the operand stack, a stack base address register which points to the base address of the operand stack, and a frame pointer (frame) register which points to the execution environment structure. In addition, this block includes a number of flags, e.g., the flags implemented in the Java Virtual Machine architecture. Other stack cache related registers and/or flags may also be included in this block, as discussed below.

An additional group of external flags are found in Enable & Status Flags block 58 which are always accessible by master processor 40 (through enable & status flag access port 59 coupled to bus 21) to handle the interaction between the master processor and slave processor 50. Block 58 includes an Enable flag which switches the slave processor between halt and run modes (described below), and further controls access by the master processor to the internal control registers and flags in block 56. Block 58 also includes an instruction trap flag that is utilized by processor 40 to determine when a platform-independent instruction cannot be processed by slave processor 50, as well as a task complete flag that is utilized by processor 40 to detect when the slave processor has successfully completed its task.

Memory transfers with slave processor 50 are handled by a cache controller 70 including a stack direct memory access unit (DMA) 72 coupled to system bus 21 as well as a separate stack cache 76 (discussed below). A tag unit 74 is utilized by DMA 72 to handle stack accesses to the stack cache (also discussed below). Data lines 73 couple DMA 72 to stack cache 76, while address lines 75 couple DMA 72 to stack cache 76 and tag unit 74.

As shown in FIG. 2, blocks 56 and 58 are coupled to bus 21 through separate access ports 57, 59 because block 56 is capable of being "locked-out" from access by master processor 40. Block 56 may be locked-out by using three state buffers in access port 57 that are controlled or gated via the enable flag in block 58, or alternatively, block 56 may be considered locked-out from master processor 40 simply due to slave processor 50 asserting control over bus 21 through bus arbitrator 44. The direct access ports 57, 59 coupled to bus 21 are utilized by master processor 40 to control and monitor slave processor 50, and it is desirable to prevent master processor 40 from modifying the control registers and flags of slave processor 50 when the slave processor is running. However, to ensure the ability of the master processor to control slave processor 50, block 58 is not similarly locked-out. Other manners of accessing blocks 56, 58, including dedicated data or I/O ports or dedicated control lines, may also be used.

Slave processor 50 also includes a co-processor interface block 54 which generates interrupts that are selectively passed to processor 40 along with other system interrupts by an interrupt controller (INT CTRL) 46, in a manner known in the art. Co-processor interface block 54 also is coupled to a bus arbitrator 44 which handles arbitration of bus 21 between processors 40 and 50, as well as any other devices coupled to the bus (not shown), also in a manner known in the art. In general, only one device is given control of bus 21 at a time, typically by asserting a REQ signal and receiving back a GRANT signal from arbitrator 44. Bus arbitrator 44 may be a simple first-come first-served arbitrator, or may alternatively grant priority to master processor 40 to enable pre-emptive control by the master processor.

Figure 3:
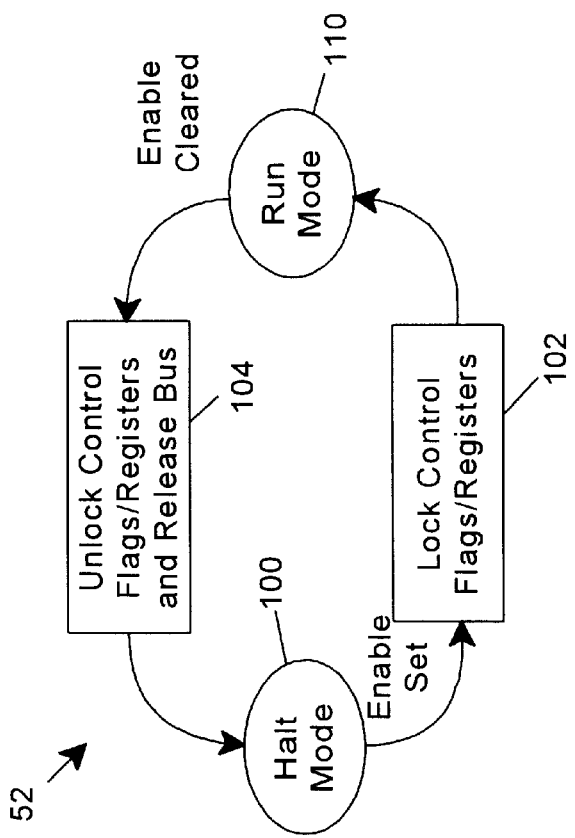
FIG. 3 is a state diagram illustrating the operational modes for the slave processor of FIG. 2.

As shown in FIG. 3, control unit 52 of slave processor is switchable between two modes, a halt mode 100 and a run mode 110, based upon the state of the enable flag in block 58. When the slave processor switches to run mode, the internal control registers and/or flags in internal control register arrangement block 56 are locked-out as shown by block 102. Similarly, when the slave processor switches to halt mode, the control registers and/or flags in block 56 are unlocked as shown by block 104. In addition, control of bus 21 by slave processor 50 is released when the slave processor is switched to halt mode (which typically means simply that the REQ line to bus arbitrator 44 is released).

Slave processor 50 is stopped and started by master processor 40 primarily by controlling the enable flag in block 58, e.g., as shown by the platform-independent program code processing routine 130 in FIG. 4. Routine 130 is executed by master processor 40 whenever the processor detects (e.g., during loading) that platform-independent program code such as Java bytecodes are going to be processed.

To enable slave processor 50 to process platform-independent program code, routine 130 first initializes the operational state of slave processor 50 in block 132 by writing suitable data into the internal control register arrangement in block 56 through port 57. The control registers and flags are written to through any number of transfer operations, e.g., through memory mapping or I/O mapping. In one embodiment, a "snapshot" of the desired initial state of slave processor 50 is maintained in system memory 25, modified as desired by master processor 40, and then copied directly to an address space mapped directly to the control registers and flags in slave processor 40. Moreover, in other embodiments multiple operational states for slave processor 50 are maintained by master processor 40 to enable the master processor to immediately switch the context of slave processor 50 to perform other tasks.

In many situations, master processor 40 maintains a memory-mapped copy of the control registers and flags and simply start execution of a block of platform-independent program code by slave processor 50 by placing the starting address of the program code in the program counter register. In addition, operands necessary for execution of the program code are stored in the slave processor stack (which is discussed below), with suitable modifications to the optop register.

Next, in block 134, master processor 40 sets the enable flag in block 58 to switch slave processor 50 from its halt mode to its run mode (FIG. 3). Next, in block 136, control over bus 21 is released by master processor 40, thereby permitting slave processor to begin execution (as discussed below). Next, routine 130 terminates to enable master processor 40 to process additional code.

Figure 5:
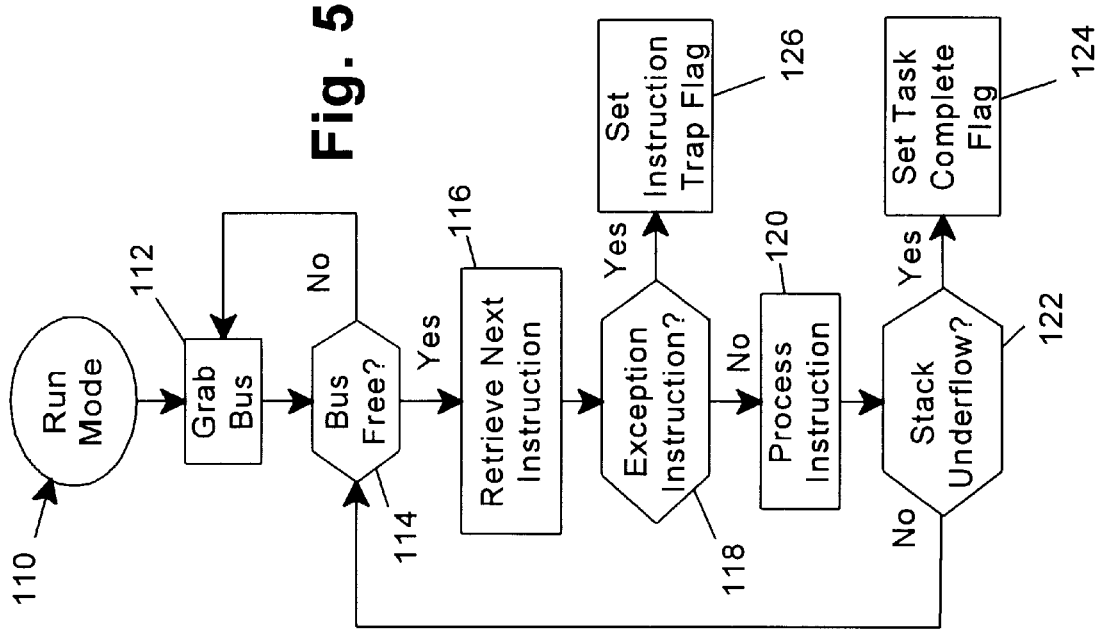
FIG. 5 is a flowchart illustrating the program flow of the run mode for the slave processor of FIG. 2.

The general operation of slave processor 50 while in run mode 110 is illustrated in FIG. 5. In general, run mode 110 reflects the main processing loop that is entered once the enable flag in block 58 is set by master processor 40 (in block 134 of FIG. 4), and after the internal control registers and flags in block 56 have be locked-out (as in FIG. 3). In blocks 112 and 114, slave processor 50 attempts to grab bus 21 by asserting its REQ line to bus arbitrator 44. Typically, control over the bus will be granted to slave processor 50 after the bus is released by master processor 40 (e.g., in block 136 of FIG. 4). As discussed above, in an alternative embodiment the control registers and flags in block 56 are not locked-out from master processor 40 until after control over the bus is granted to slave processor 50.

Next, in block 116, the platform-independent instruction pointed to by the program counter in retrieved from memory. In block 118, the instruction is tested to determine whether it is implemented in the slave processor. As discussed above, certain instructions are omitted in some embodiments to simplify the slave processor, particularly instructions which are code-intensive but are not executed frequently. In these instances, an exception is signaled to enable master processor 40 to regain control of the bus and process the instruction through software interpretation. The exception is handled in block 126 by setting the instruction trap flag in block 58 of slave processor 50, which is decoded by dedicated logic in co-processor interface 54 to signal an interrupt to master processor 40. Alternatively, in another embodiment the interrupt is positively asserted in block 126.

If the currently-processed instruction is not an exception instruction, control passes from block 118 to block 120 where the instruction is processed in accordance with the Java Virtual Machine Specification. Next, in block 122 a stack underflow condition is tested, which occurs when the task or routine allocated to the slave processor has been completed and the last return call has been processed. When this condition is not indicated, control passes to block 112 to continue processing the next instruction in the platform-independent program code. If, however, the condition is indicated, control passes instead to block 124 where the task complete flag in block 58 is set. Co-processor interface 54 also includes dedicated logic to signal an interrupt to master processor 40. Alternatively, in another embodiment the interrupt is positively asserted in block 124.

Master processor 40 handles exception instructions through an exception processing routine 140, a relevant portion of which is illustrated in FIG. 6. Whenever an exception (interrupt) is detected by the master processor, control passes to this routine, where in block 142 the enable flag in block 58 of slave processor 50 is cleared. As shown in FIG. 3, this has the effect of switching slave processor 50 to halt mode 100. Next, in block 144, the instruction trap flag in block 58 of slave processor 50 is tested to determine whether slave processor 50 signaled the interrupt due to the need to process an exception instruction. If this flag is not set, control passes to block 145 to handle other exceptions, e.g., the task complete exception that is generated when the slave processor has completed a task, or other exceptions generated by other system devices.

If the instruction trap flag is set, control passes to block 146, where the current operational state is retrieved from the slave processor. From this information, master processor 40 is able to process the exception instruction in block 148, typically using a known software interpreter which relies on the operational state of the slave processor as its "virtual" operational state. Once the exception instruction is processed, the updated operational state is stored back into slave processor 50 in block 150, the enable flag is set in block 152, and the bus in released by master processor 40 in block 154, to in effect restart slave processor 50 in the state it would expect to be in after execution of the exception instruction. Control then returns to handle the normal processing for master processor 40.

It should be appreciated that master processor 40 also has the ability to halt execution of slave processor 50 at any time through control of the enable flag. This is required, for example, when a system reset is needed. Moreover, in some embodiments slave processor 50 also has the ability to halt its execution rather than relying on master processor 40. For example, after executing block 124 or block 126 of FIG. 5, slave processor 50 may clear the enable flag, thereby causing the slave processor to return to halt mode 100.

In addition, it should be appreciated that after master processor 40 relinquishes control of the bus to slave processor 50, it does not necessarily halt its own execution even though it does not have access to the bus. In particular, when master processor 40 includes a cache such as LI cache 42, no system memory accesses may be immediately required, thereby enabling processors 40, 50 to run in parallel until a bus access by processor 40 is required. In addition, it is believed that other manners of enabling processors 40, 50 to execute in parallel while locking-out the operational state of slave processor 50 from access by master processor 40 may be utilized.

A number of advantages are obtained through the use of the various embodiments disclosed herein. For example, when slave processor 50 is a Java co-processor, it should be appreciated that computer system 10 is able to receive Java program code and process it with the same order of efficiency and performance expected for program code that is native to the master processor in the system (although one processor still may perform better than the other due to variations in design, clock speed, etc.). In contrast to conventional computer systems which rely on interpreters or JIT compilers, or computer systems which utilize dedicated processors, two often disparate types of program code may be executed under optimum conditions with little degradation in performance compared to conventional single processor systems. Consequently, it should be appreciated that the benefits of the invention extend beyond Java bytecode acceleration.

Stack Cache

As discussed above, specific embodiments of the invention also include a stack cache which improves the overall performance of a stack-based processor such as slave processor 40 of FIG. 2. Specific embodiments of the invention operate by maintaining a contiguous group of stack entries in the cache and pre-emptively rotating stack entries or blocks of stack entries at the ends of the contiguous group of stack entries between the cache and the system memory such that stack operations by the processor are performed using the cache. When used in conjunction with any of the master/slave multi-processor systems disclosed above, the performance of the slave processor is accelerated, often bringing the performance of the slave processor more in-line with that of the master processor.

As shown in FIG. 2, stack 78 utilized for slave processor 50 is stored in RAM 28. However, memory accesses to the stack are accelerated using a stack cache 76, which in the illustrated embodiment is a high speed cache memory (e.g., typically an on-board CMOS SRAM memory) that forms a circular array of cache entries arranged into segments. Stack cache 76 is disposed on the same integrated circuit device as slave processor 50, or in other embodiments is disposed on a separate integrated circuit, and, for example, mounted on the same carrier such as a multichip module.

In the illustrated embodiment, each segment (designated A–D) in stack cache 76 includes 16 32-bit cache entries. The stack cache operates as a "moving window" to a contiguous group of stack entries stored in stack 78. The contents of the stack cache are frequently updated to in effect move the contiguous group with the stack pointer in the slave processor.

A cache controller 70 controls stack cache 76 and includes DMA unit 72 and tag unit 74 coupled to system bus 21. DMA unit 72 handles block transfers between stack 78 in RAM 28 and stack cache 76, as well as handling memory accesses to cached portions of the stack that are requested by external devices such as master processor 40. DMA unit 72 includes a state machine to control the handling of these aforementioned functions. DMA unit 72 also restricts access to the stack cache by master processor 40 when slave processor 50 is in run mode. In addition, a stack flush flag and a stack initialization flag are maintained in block 56 (and thus are locked-out from processor 40 when slave processor 50 is in run mode) and monitored by DMA unit 72 to enable master processor 40 to respectively flush and re-initialize the stack cache (as discussed below).

Tag unit 74 stores low and high address pointers, designated CacheLow and CacheHigh, which respectively store addresses pointing to the first and last stack entries in the contiguous group of stack entries maintained in stack cache 76. In response to a memory access request to a memory address between these two values (a "hit"), tag unit 74 invalidates the request through a control line to memory controller 29 to halt the memory controller from outputting the contents of the accessed located on bus 21. Tag unit 74 also notifies DMA unit 72 through a separate control line so that the memory access request is instead handled by DMA unit 72. DMA unit 72 controls tag unit 74 through setting CacheLow and CacheHigh, as well as through an enable flag that disables the tag unit when no stack entries are being maintained in stack cache 76 (e.g., after a stack flush operation). In addition, tag unit 74 and/or DMA unit 72 may be configured to provide access control through rejecting any memory accesses (i.e., "locking out" the memory) or issuing an exception whenever a memory access is made to the stack cache while the slave processor is in a run mode.

Figure 7:
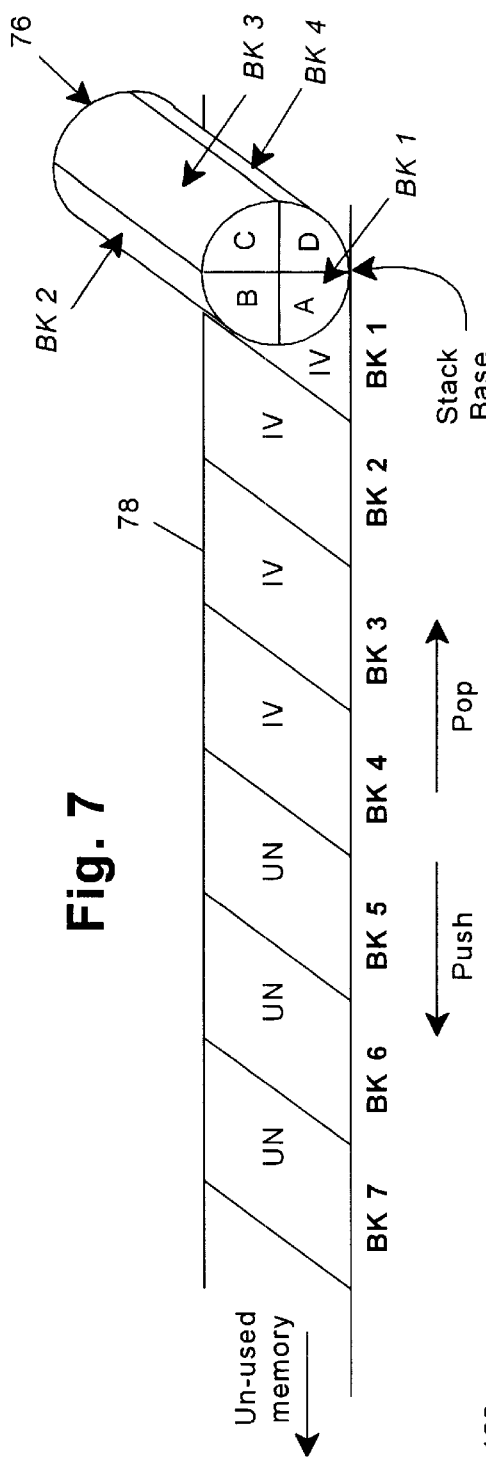
FIG. 7 is a functional diagram illustrating the interaction of the stack cache with a stack stored in the system memory, both of which are shown in FIG. 2.

As shown in FIG. 7, for example, stack cache 76 is a circular array of entries (segmented into segments A–D) which may be analogized to a "barrel" that rolls over the contents of stack 78. Upon initialization of the stack (typically by host processor 40 setting the stack base address register and the operand stack pointer (optop) register in block 56 of slave processor 50—both of which will point initially to "stack base"), each block (e.g., BK 1–BK 7) in stack 78 is empty (designated "UN"). DMA unit 72 "invalidates" the first four blocks of entries in stack 78 (designated "IV") by setting CacheLow and CacheHigh in tag unit 74 to respectively point to the starting address of the first block and the ending address of the fourth block, whereby segments A–D in stack cache 76 reflect a copy of the contiguous group of stack entries in BK 1–BK 4. It should be appreciated that the "blocks" in stack 78 and the "segments" in stack cache 76 are the same number of entries, but are designated differently for illustrative purposes.

Once slave processor 50 enters run mode, data (here operands) are pushed and popped on stack cache 76 as if it were memory starting in segment A down toward segment D. It will be appreciated that a stack underflow condition (where the stack pointer points below the base address of the stack) is an exception condition which is handled as described above by master processor 40 and slave processor 50. In general, for push and pop operations, when the stack pointer crosses into a first end block in the contiguous group of stack entries, the DMA unit flushes an opposite, second end block in the contiguous group of stack entries from the stack cache and retrieves a block of stack entries adjacent the first end block into the stack cache.

Figure 8:
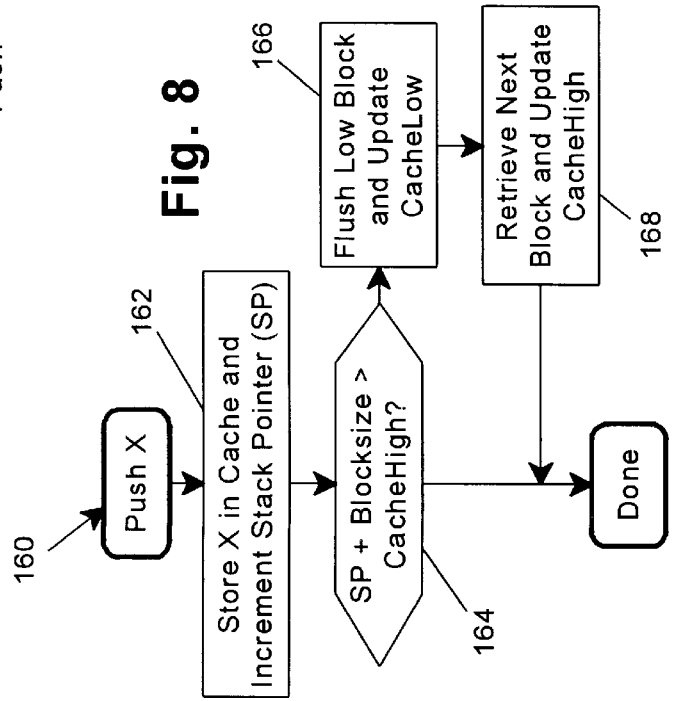
FIG. 8 is a push routine executed on the cache controller of FIG. 2.

A push operation is illustrated in FIG. 8 by a Push X routine 160 executed by DMA unit 72. First, DMA unit 72 in block 162 handles the push operation by storing the value to be pushed (here "X") in the cache at the top of the stack and incrementing the stack pointer register. Next, DMA unit 72 checks in block 164 whether the updated stack pointer has crossed a block boundary and is now in the highest block stored in the stack cache by checking if the stack pointer address added to the blocksize points to an address beyond the highest address of the stack cache (represented by CacheHigh). If it is not, then no further processing is required.

However, if this block boundary has been crossed, control passes to blocks 166 and 168 to exchange the entries stored in the lowest block in the stack cache with the contents of the next block in the stack. In block 166, DMA unit 72 flushes the lowest block in stack cache 76 back to stack 78 and updates CacheLow to point to the new lowest block in the stack cache (typically by adding the blocksize to CacheLow). Then, in block 168, the next block in stack 78 is retrieved into the segment where the previously lowest block was just flushed from stack cache 76 and CacheHigh is updated to point to the last address in this new block (typically by adding the blocksize to CacheHigh). Routine 160 is then complete.

As an example, FIG. 9(a) illustrates the conditions of stack cache 76 and stack 78 prior to the stack pointer crossing boundary 3 between stack cache segments C & D, where it is to be noted that stack cache segments A–D still have the same initial contents as shown in FIG. 2. As shown in FIG. 9(b), after the stack pointer crosses boundary 3 between stack cache segments C & D as the result of a push operation, routine 160 detects that the stack pointer plus the blocksize points to a stack entry in BK 5, which is greater than CacheHigh. BK 1, the lowest block in stack cache 76, is flushed to stack 78 and segment A, which previously stored BK 1, is updated with the contents of BK 5, the next block in stack 78. Moreover, CacheLow and CacheHigh are updated to now point, respectively, to the first entry in BK 2 and the last entry in BK 5. This operation in effect re-aligns segment A of stack cache 76 to "roll" after segment D as more data is pushed onto the stack.

Figure 10:
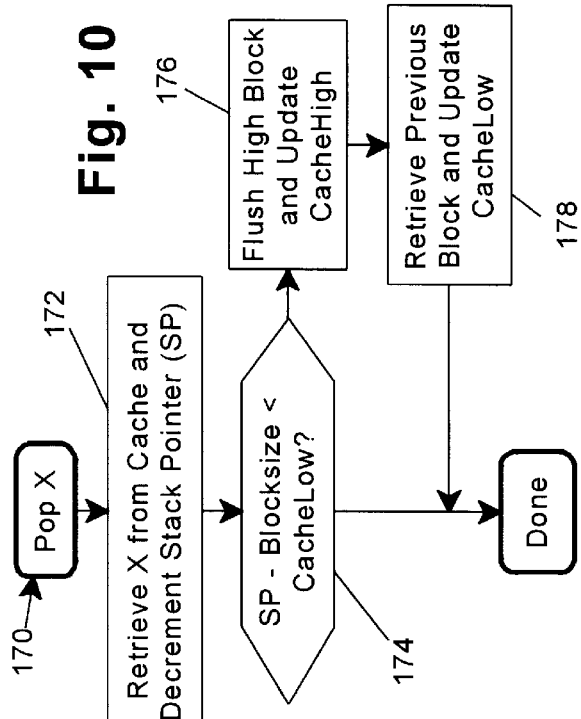
FIG. 10 is a pop routine executed on the cache controller of FIG. 2.

A pop operation is similar to a push operation and is illustrated in FIG. 10 by a Pop X routine 170 executed by DMA unit 72. In this routine, DMA unit 72 in block 172 handles the pop operation by retrieving the top value on the stack from the cache and decrementing the stack pointer register. Next, DMA unit 72 checks in block 174 whether the updated stack pointer has crossed a block boundary and is now in the lowest block stored in the stack cache by checking if the stack pointer address less the blocksize points to an address beyond the lowest address of the stack cache (represented by CacheLow). If it is not, then no further processing is required.

However, if this block boundary has been crossed, control passes to blocks 176 and 178 to exchange the entries stored in the highest block in the stack cache with the contents of the previous block (or next lowest block) in the stack. In block 176, DMA unit 72 flushes the highest block in stack cache 76 back to stack 78 and updates CacheHigh to point to the last address in the new highest block in the stack cache (typically by subtracting the blocksize from CacheHigh). Then, in block 178, the previous block in stack 78 is retrieved into the segment where the previously highest block was just flushed from stack cache 76 and CacheLow is updated to point to this new block (typically by subtracting the blocksize from CacheHigh). Routine 170 is then complete.

As an example, FIGS. 11 (a) and 11 (b) illustrate the conditions of stack cache 76 and stack 78 before and after a pop operation. As shown in FIG. 11 (a), prior to the pop operation, the stack has been filled up to BK 7, whereby stack cache 76 has "rolled" to the point at which segment D contains BK 4, segment A contains BK 5, segment B contains BK 6 and segment C contains BK 7, whereby CacheLow points to the first entry in BK 4 and CacheHigh points to the last entry in BK 7. Then, as shown in FIG. 11 (b), after the stack pointer crosses boundary 0 between stack cache segments D & A as a result of a pop operation, routine 170 detects that the stack pointer less the blocksize points to a stack entry in BK 3, which is less than CacheLow. BK 7, the highest block in stack cache 76, is flushed to stack 78 and segment C, which previously stored BK 7, is updated with the contents of BK 3, the previous block in stack 78. Moreover, CacheLow and CacheHigh are updated to now point, respectively, to the first entry in BK 3 and the last entry in BK 6. This operation in effect re-aligns segment C of stack cache 76 to "roll" after segment D as more data is popped from the stack.

Figure 12:
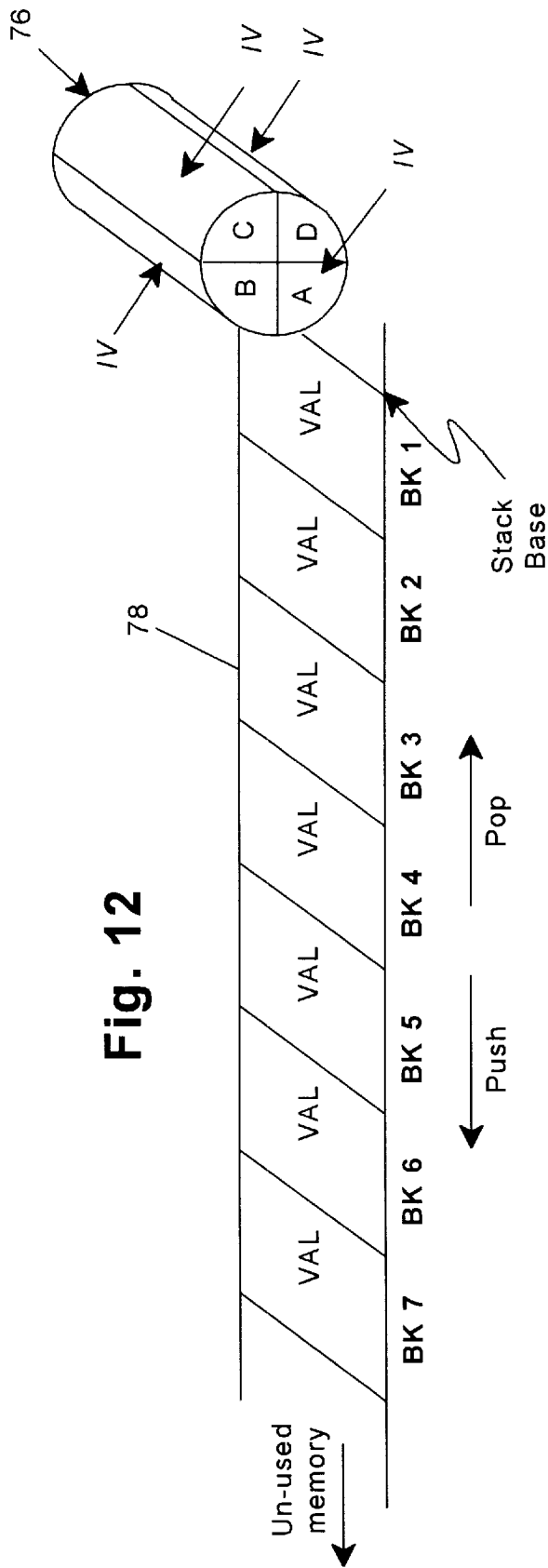
FIG. 12 is a functional diagram illustrating the interaction of the stack cache with the stack after a stack flush operation.

FIG. 12 illustrates the result of a stack flush operation, which may be initiated by slave processor 50, as well as by master processor 40 when slave processor 50 is in a halt mode, by setting the stack flush flag in block 56. In a flush operation, DMA unit 72 flushes the contents of stack cache 76 to stack 78 and disables tag unit 74. Accordingly, as shown in this figure, all segments of stack cache 76 are invalidated and all of the contents of stack 78 are directly accessible from memory 28.

Initialization of the stack may be initiated by either processor 40, 50 (initiation by master processor 40 may only occur when slave processor 50 is in halt mode) by providing DMA unit 72 with new CacheLow and CacheHigh values and setting the stack initialization flag in block 56. The CacheLow and CacheHigh values are provided to the DMA unit by writing the values to dedicated registers in block 56, whereby DMA unit 72 programs the new values into tag unit 74. Generally, no entries in the stack cache need to be updated during stack initialization since in most instances the stack is empty upon initialization. However, should initial stack entries be required, either processor 40, 50 or DMA unit 72 may store appropriate stack entries into stack cache 76.

Through a combination of the above operations on stack cache 76, master processor 40 is capable of directly accessing and modifying the stack contents of slave processor 50 during the halt mode to further set the initial operational state of slave processor 40. However, it should also be appreciated that the various stack cache implementations discussed herein may be utilized in single processor computer systems, and consequently, some of the external access operations such as stack flush and stack initialization may not be required in some circumstances. Moreover, while the greatest benefits of the various stack cache implementations are obtained when utilized in conjunction with a stack-based processor such as for implementing the Java Virtual Machine Specification, other processors which are capable of utilizing or implementing a stack or other first-in-first-out (FIFO) data structure (which includes practically any processor), may also be used consistent with the invention.

Various modifications may be made to the illustrated embodiments without departing from the spirit and scope of the invention. For example, the size of each entry, as well as the size of each segment and the number of segments, in the stack cache may vary depending upon the application. Moreover, it should be appreciated that entries may not be broken into segments, and that the contiguous group of entries maintained in the stack cache may be moved entry-by-entry, which would require the stack cache to be updated after every push or pop operation. However, given that block transfer operations using a DMA are quite efficient, particularly when RAM 28 is implemented with memory devices optimized suited for such operations (e.g., EDO, BEDO or Synchronous DRAM, among others), it is believed that processing segments of cache entries will generally provide better performance.

Moreover, it should be noted that no header information or status flags (e.g., valid/invalid) are required for stack cache segments unlike many conventional memory cache systems, since the actual modification of the stack contents during the run mode of the slave processor always occurs through the cache. In addition, cache coherency is typically not a concern for this reason. However, it should be appreciated that status flags or other cache coherency protocols and processing may be used in the alternative.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A circuit arrangement, comprising:

a system memory;

a slave processor coupled to the system memory and including,
 a control unit configured to process instructions of a first set retrieved from the system memory by the slave processor, wherein the first set of instructions is native to the slave processor,
 an internal control register arrangement configured to provide at least one of several operational states for the slave processor,
 a program counter register in the internal control register arrangement configured to point to an address of a next instruction to be processed by the control unit, and
 a control register access port coupled to the internal control register arrangement to provide external access thereto; and a master processor coupled to the system memory and coupled to the slave processor, the master processor configured to process instructions of a second set retrieved from the system memory and to selectively start execution of the slave processor with a predetermined operational state by writing data into the internal control register arrangement through the control register access port to modify the program counter register, wherein the second set of instructions is native to the master processor and different from the first set.

2. The circuit arrangement of claim 1, wherein the master processor is a load/store architecture RISC processor and the slave processor is a stack-based processor.

3. The circuit arrangement of claim 2, wherein the slave processor is a Java co-processor.

4. The circuit arrangement of claim 1, wherein the internal control register arrangement in the slave processor further includes a stack pointer register, a stack base address register, a frame pointer register, and a variable pointer register.

5. The circuit arrangement of claim 1, wherein the internal control register arrangement in the slave processor further includes a status register having at least one internal control flag, and wherein the master processor is configured to set the internal control flag when setting the operational state of the slave processor.

6. The circuit arrangement of claim 1, wherein the slave processor is configured to selectively operate in halt and run modes, and wherein the slave processor includes an enable flag, controlled by the master processor, which switches the slave processor between the halt and run modes, whereby the master processor starts and stops execution of the slave processor through control of the enable flag.

7. The circuit arrangement of claim 6, wherein the control register access port is coupled to the master processor over a bus, and wherein the control register access port is configured to isolate the internal control register arrangement from the bus to restrict access by the master processor to the internal control register arrangement when the slave processor is in the run mode.

8. The circuit arrangement of claim 1, wherein the slave processor includes an interface, coupled to the master processor, through which the slave processor notifies the master processor of an exception.

9. The circuit arrangement of claim 8, wherein the slave processor includes an instruction trap flag, accessible by the master processor, configured to notify the master processor of an unhandled instruction to thereby permit the master processor to process the unhandled instruction.

10. The circuit arrangement of claim 8, wherein the slave processor further includes a task complete register, accessible by the master processor, configured to notify the master processor when the slave processor has completed a task.

11. The circuit arrangement of claim 1, further comprising a bus arbitrator coupled to the master and slave processors, the bus arbitrator configured to arbitrate access to the system memory by the master and slave processors.

12. The circuit arrangement of claim 11, wherein the master processor includes a cache; whereby the master processor may run in parallel with the slave processor when the slave processor has access to the system memory.

13. A circuit arrangement, comprising:
a system memory;
a slave processor coupled to the system memory and including,
a control unit configured to process instructions of a first set retrieved from the system memory by the slave processor, wherein the first set of instructions is native to the slave processor,
an internal control register arrangement configured to provide at least one of several operational states for the slave processor,
a program counter register in the internal control register arrangement configured to point to an address of a next instruction to be processed by the control unit, and
a control register access port coupled to the internal control register arrangement to provide external access thereto;
a master processor coupled to the system memory and coupled to the slave processor, the master processor configured to process instructions of a second set retrieved from the system memory and to selectively start execution of the slave processor with a predetermined operational state by writing data into the internal control register arrangement through the control register access port to modify the program counter register wherein the second set of instructions is native to the master processor and different from the first set;
a stack cache, coupled to the slave processor, the stack cache including a plurality of cache entries arranged in a circular array; and
a cache controller, coupled between the stack cache and the system memory, the cache controller configured to maintain in the stack cache a copy of a contiguous group of stack entries from the memory, the contiguous group of stack entries including the current stack entry pointed to by the stack pointer register, wherein the cache controller is configured to selectively transfer selected stack entries at ends of the contiguous group of stack entries between the memory and the stack cache as the stack pointer register is updated by the slave processor such that all stack transfer operations performed by the slave processor occur between the slave processor and the stack cache.

14. The circuit arrangement of claim 13, wherein the system memory includes a memory controller for controlling access thereto, and wherein the cache controller includes:

a direct memory access (DMA) unit configured to handle memory transfers between the system memory and the stack cache, the DMA unit further configured to restrict access to the stack cache by the master processor during a run mode of the slave processor; and
a tag unit, coupled to the bus and to the memory controller, the tag unit configured to store low and high addresses for the contiguous group of stack entries, wherein the tag unit is further configured to disable the memory controller for memory accesses to the contiguous group of stack entries.

15. The circuit arrangement of claim 14, wherein the slave processor includes a stack flush flag isolated from the master processor when the slave processor is in the run mode, wherein in response to the stack flush flag, the DMA unit flushes the contiguous group of stack entries from the stack cache to the system memory.

16. The circuit arrangement of claim 1, further comprising a circuit board on which the slave processor, the master processor, and the system memory are disposed and intercoupled.

17. The circuit arrangement of claim 1, wherein the slave processor and master processor are implemented with an integrated circuit.

18. The arrangement of claim 1, wherein the first set of instructions are comprised of platform-independent instructions.

19. A computer system, comprising:
a system memory;
a slave processor coupled to the system memory and including,
a control unit configured to process instructions of a first set retrieved from the system memory by the slave processor, wherein the first set of instructions is native to the slave processor,
an internal control register arrangement configured to provide at least one of several operational states for the slave processor,
a program counter register in the internal control register arrangement configured to point to an address of a next instruction to be processed by the control unit, and
a control register access port coupled to the internal control register arrangement to provide external access thereto; and
a master processor coupled to the system memory and coupled to the slave processor, the master processor configured to process instructions of a second set retrieved from the system memory and to selectively start execution of the slave processor with a predetermined operational state by writing data into the internal control register arrangement through the control register access port to modify the program counter register, wherein the second set of instructions is native to the master processor and different from the first set.

20. The arrangement of claim 19, wherein the first set of instructions are comprised of platform-independent instructions.

21. A method of processing instructions with a master processor and a slave processor coupled to the master processor, wherein the instructions are stored in a system memory that is coupled to the master and slave processors, and the instructions are comprised of a first set that is native to the master processor and a second set that is native to the slave processor, the method comprising:
processing instructions of the first set by the master processor;

detecting instructions of the second set by the master processor;

setting, upon detection of an instruction of the second set an operational state of the slave processor with the master processor by programming an internal control register arrangement in the slave processor, the internal control register arrangement configured to provide the operational state for the slave processor, and the internal control register arrangement including a program counter register;

starting execution of the slave processor with the master processor;

retrieving instructions of the second set from the system memory by the slave processor; and processing instructions of the second set by the slave processor.

22. The method of claim 21, wherein starting execution of the slave processor includes setting an enable flag on the slave processor with the master processor after the operational state of the slave processor has been set.

23. The method of claim 22, wherein starting execution of the slave processor further includes restricting access by the master processor to the internal control register arrangement in the slave processor.

24. The method of claim 22, wherein the master and slave processors are coupled to one another and to a system memory over a bus, wherein access to the bus is controlled by a bus arbitrator coupled to the master and slave processors, and wherein the method further comprises releasing the bus from control by the master processor to thereby permit the slave processor to gain access to the system memory.

25. The method of claim 21, further comprising setting an instruction trap flag in the slave processor when the slave processor does not process an instruction.

26. The method of claim 25, further comprising setting a task complete flag in the slave processor when the slave processor has completed a task.

27. The method of claim 25, further comprising signaling an interrupt to the master processor with the slave processor, wherein the master processor has access to the instruction trap and task complete flags to determine the cause of the interrupt.

28. The arrangement of claim 21, wherein the first set of instructions are comprised of platform-independent instructions.

* * * * *